United States Patent [19]

Petersen

[11] Patent Number: 4,469,370
[45] Date of Patent: Sep. 4, 1984

[54] SUNROOF WITH DETACHABLE CONNECTOR

[76] Inventor: Robert J. Petersen, 4432 Pinyon Tree La., Irvine, Calif. 92715

[21] Appl. No.: 332,721

[22] Filed: Dec. 21, 1981

[51] Int. Cl.³ .............................................. B60J 7/18
[52] U.S. Cl. .................................. 296/218; 296/224; 41/465; 292/263
[58] Field of Search .................. 296/216, 218, 224; 292/128, 263; 49/465

[56] References Cited

U.S. PATENT DOCUMENTS

| | | | |
|---|---|---|---|
| 1,494,403 | 5/1924 | Ayres | 292/263 |
| 3,208,781 | 9/1965 | Appleberry | 292/128 |
| 3,974,753 | 8/1976 | Blogrem et al. | 98/2.14 |
| 4,021,073 | 5/1977 | Manning | 292/263 |
| 4,067,605 | 1/1978 | Green et al. | 296/218 |
| 4,130,966 | 12/1978 | Kujawa, Jr. et al. | 49/141 |
| 4,154,747 | 5/1979 | Hough et al. | 296/218 |
| 4,161,336 | 7/1979 | LeVan et al. | 296/218 |
| 4,205,875 | 6/1980 | Smith | 296/218 |
| 4,216,983 | 8/1980 | Hough et al. | 292/263 |
| 4,257,632 | 3/1981 | DeStepheno | 292/263 |
| 4,281,476 | 8/1981 | Levan | 49/465 |
| 4,364,600 | 12/1982 | Hauber | 296/218 |

Primary Examiner—Robert B. Reeves
Assistant Examiner—Dennis H. Pedder
Attorney, Agent, or Firm—Gausewitz, Carr, Rothenberg & Edwards

[57] ABSTRACT

A hinged closure panel of a vehicle sunroof is detachably connected and locked to its frame by means of an articulated latch pivoted at one end to a detachable connector. The connector has projections extending outwardly and upwardly into mating recesses in the frame so as to prevent all motion of the connector relative to the frame except only a single downwardly pivoting motion. This one motion is itself restrained by a connector lock pivoted on the connector and spring urged into locking condition.

10 Claims, 5 Drawing Figures

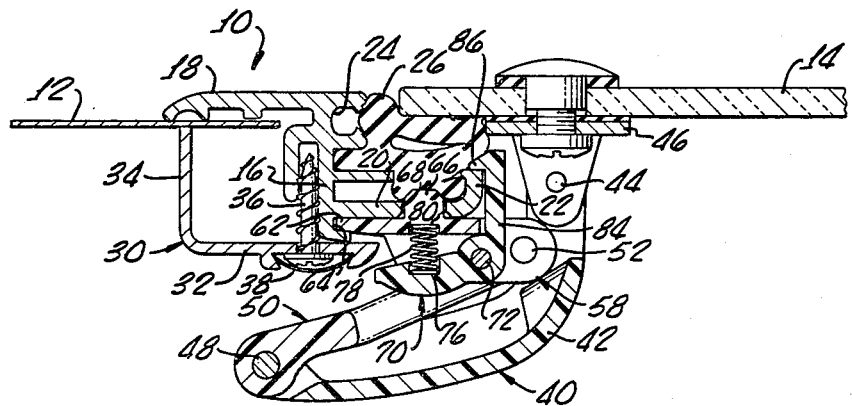
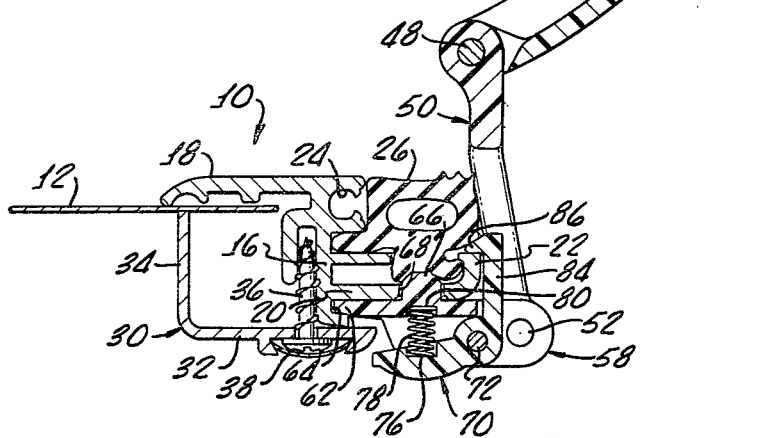
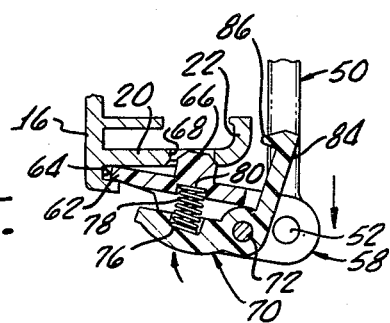

SUNROOF WITH DETACHABLE CONNECTOR

BACKGROUND OF THE INVENTION

The present invention relates to closure panels, and more particularly concerns a closure panel for a vehicle sunroof that is adjustably latched and detachably connected to the panel frame.

A widely used type of vehicle sunroof embodies a perimetrical frame to the front side of which is pivoted a closure panel. The panel is connected to the back side of the frame by an articulated latch that enables the panel to be closed and securely locked in place or to be opened at an angle to the roof and supported in such open position. Usually, the articulated latch is detachably connected to the panel or to the frame so that when the latch is disconnected the panel may be pivoted through a considerably larger angle. This allows it to be completely detached at its hinged side so that the panel may be entirely removed from the frame. Detachable latches of this general configuration are shown in U.S. Pat. Nos. 3,974,753, 4,067,605, 4,130,966, 4,154,474, 4,161,336, 4,205,875, 4,216,983, and 4,257,632. Some of the prior arrangements of this type employ removable locking pins that must be removed to allow the latch to be disconnected. Removal of such pins is relatively inconvenient, making the connection and disconnection of the panel more difficult. Further, since the pins are often completely detachable, they may be readily misplaced or lost, which requires acquisition of additional pins before a secure latching of the panel can again be achieved.

The latch must be located on the inside of the panel so that it can be readily accessible to a person within the vehicle. Accordingly, brackets, clips and other attaching devices used for the detachable connection of the latch to the frame have been placed on the frame. These devices project downwardly into the vehicle compartment, creating areas of potential danger to an occupant who might come into contact with the projections during an accident or other unexpected or unusual vehicle motion. In some prior devices the latch is disconnected from the panel and always remains attached to the frame. Others employ plural locking devices and therefore are more inconvenient to operate, often requiring two hands.

Accordingly, it is an object of the present invention to provide a sunroof and a detachable latch therefor that avoids or minimizes above-mentioned problems.

SUMMARY OF THE INVENTION

In carrying out principles of the present invention in accordance with a preferred embodiment thereof, a closure panel hinged to a perimetrical frame has a fastening device that detachably connects the panel to the frame, the fastening device including a connector body, with mutually disengageable and engageable parts on the frame and connector body, and a releasable locking means for restraining disengagement of the interengaged parts. According to a feature of the invention, the connector and frame have mutually interengageable means that restrain all motion of the connector relative to the frame except a pivotal downward motion. A releasable locking finger is provided to engage the frame and prevent this pivotal downward motion. According to another feature of the invention, there are no parts of the connecting devices projecting downwardly into the vehicle. The engageable parts of the frame are in the form of recesses so that there are no projecting parts extending into the occupant compartment.

BRIEF DESCRIPTION OF THE DRAWINGS

FIG. 3 is a vertical sectional view of the device in latched condition, showing parts of a vehicle roof and closure panel;

FIG. 4 is a view similar to FIG. 3 illustrating the parts with the panel in open but connected condition; and FIG. 5 shows the connector body in the course of its pivotal and tilting motion to and from its locked condition.

DETAILED DESCRIPTION

Figure 1:
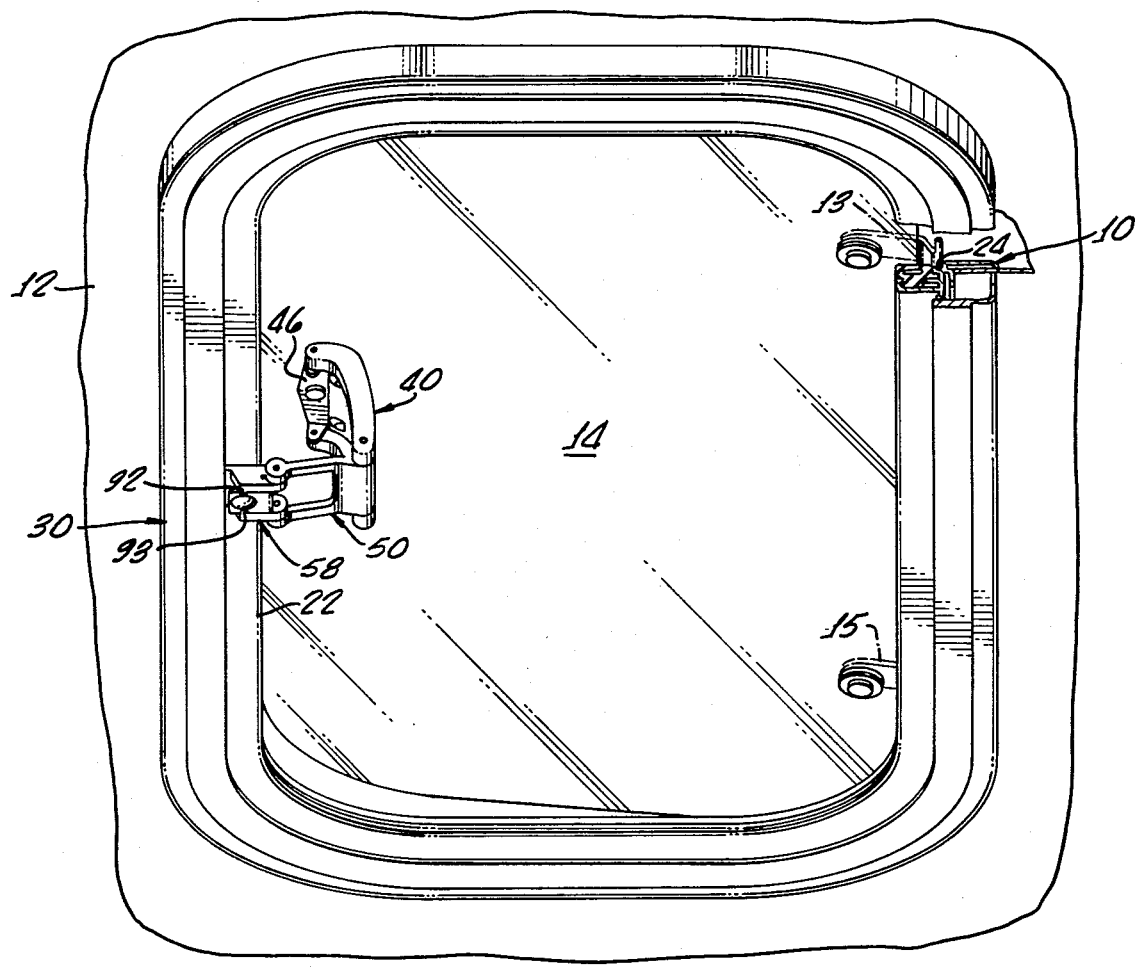
FIG. 1 is a perspective view of a sunroof frame and panel embodying principles of the present invention.

As illustrated in FIG. 1, a perimetrical frame 10 circumscribes an opening in a vehicle wall such as a roof 12 and is arranged to pivotally and detachably carry a sealed closure member in the form of a glass panel 14 connected to one side of the frame by detachable hinges 13, 15. The perimetrical frame, has a constant cross section substantially throughout its length as illustrated in FIGS. 3 and 4. The frame may be an extrusion of aluminum, plastic or the like, or may be formed by other methods, such as injection molding. A vertically extending wall part 16 terminates at its upper end in an outwardly extending upper wall 18 and, at its lower end, has an inwardly projecting downwardly facing lower perimetrical member 20 which provides a horizontally extending perimetrical surface for engagement with a detachable connector to be described below. Lower perimetrical member 20 terminates at its inward end in an upstanding substantially vertical leg portion 22 which helps to retain a resilient perimetrical sealing gasket 26. A recess 24 is formed in an inner edge of upper wall portion 18 and, at the opposite side of the frame, is partly cut away (FIG. 1) at two places to receive hinge pins that are part of the panel hinges 13, 15 for pivotal mounting of the panel in a manner well known to those skilled in the art.

An angulated perimetrical trim or garnish strip 30 has a horizontal section 32 extending below the inner portion of the frame and a vertical section 34 extending upwardly into contact with a portion of the vehicle roof panel 12 below the outer edge of upper frame wall 18. A plurality of screws 36, located at spaced intervals around the perimeter of the frame, pass through holes in the horizontal section 32 of the garnish strip and into threaded engagement with the frame 10 to thereby clamp the frame securely to the edge of the opening in the roof 12. A vinyl strip 38 is snapped into the garnish strip 30 to cover the screws.

An articulated latch 40 has a first link 42 pivoted at 44 to a bracket 46 that is fixedly secured adjacent the back edge of the closure panel 14. Link 42 is pivoted as at 48 to a second substantially U-shaped latch link 50 which has ends of its legs 49, 51 pivotally connected on spaced coaxial pivot pins 52, 53 to connector ears 54, 56 that project inwardly from the main portion of a latch connector body 58. Connector body 58 has a flat upwardly facing surface 60 terminating in an outwardly projecting tapered tongue 62 that is received in a lower inwardly facing perimetrical channel or groove 64 formed at the lower edge of wall 16 of frame extrusion 10. The lower side of groove 64 inclines downwardly and inwardly to enable the slight pivotal motion required for connection and disconnection, as will be described below. At a central portion of the connector surface 60 is a fixed upstanding pin 66 that projects into a circular aperture 68 extending vertically through the lower perimetrical member 20 of the frame extrusion. The free end of pin 66 and the lower side of aperture 68 are both chamfered to facilitate insertion of the pin into the aperture during the pivotal connecting and disconnecting motion. This enables the pin to be a closer fit in aperture 68 so as to provide a more secure and rigid connection.

Figure 2:
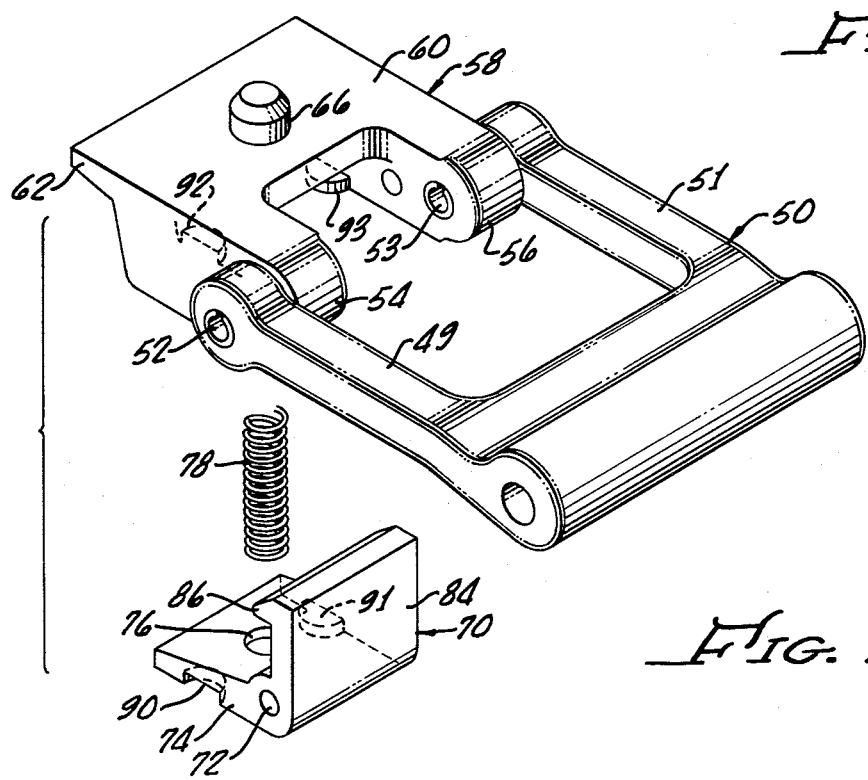
FIG. 2 is an exploded perspective view of parts of the latching mechanism.

The connector body is secured to the frame by a lock in the form of a bell crank 70 pivoted at 72 to the connector body and having a generally horizontal arm 74 extending outwardly from pivot 72 between the connector ears 54, 56 and below the connector body 58. Bell crank arm 74 is formed with an upwardly facing centrally located recess 76 in which is seated a compression spring 78 having its other end received in a downwardly facing recess 80 formed in the lower surface of the connector body. The bell crank has a substantially vertical upwardly extending arm 84 which has an outwardly extending locking lip or finger 86 that overlies and engages the uppermost end of leg portion 22 of the frame. Side edges of the lower surface of horizontal arm 74 are formed with recesses 90, 91 (FIG. 2) in which are seated tabs 92, 93 that project toward one another from ears 54, 56 to limit counterclockwise motion (as viewed in FIG. 3) of the bell crank from its locked position, illustrated in FIG. 3.

By pivotally moving the articulated latch links 42, 50 about their respective pivot points 44, 48, 53, the closure panel 14 may be moved from the closed and securely latched position illustrated in FIG. 3 to the fully open position shown in FIG. 4. If it is desired to hold the panel 14 in a position intermediate the closed and open positions of FIGS. 3 and 4 respectively, a suitable ratchet mechanism (not shown), or a spring-pressed detent and a series of apertures (not shown), may be provided in the two link members at or about pivot 48 or in the link member 50 and connector ears 54, 56 at or about pivot 52. In the positions illustrated in FIGS. 3 and 4 and at all positions therebetween, latch connector 58 remains fully, firmly and securely attached to the frame.

If it is desired to completely remove the panel 14 from the frame, the panel must be pivoted upwardly through an angle very much greater than that illustrated in the open position of FIG. 4. In such a position, the hinges 13, 15 can be disconnected from main frame 10. To move to such a position the articulated latch must be disconnected. To accomplish such disconnection, the latch links are moved to the open position of FIG. 4, bell crank 70 is rotated clockwise (as viewed in FIG. 3) about its pivot 72, compressing spring 78 and withdrawing locking lip 86 of the bell crank from its overlying engagement with the upper edge of frame leg portion 22. With the bell crank in its unlocked, disengaged position, the connector body is still restrained against almost all motions relative to the frame by means of the interengagement of the pin 66 and aperture 68 and also by interengagement of tongue 62 and groove 64. These interengaged and disengageable parts prevent inward and outward motion of the connector body relative to the frame and also prevent upward and lateral motion of the connector body relative to the frame. However, with the bell crank lock disengaged the connector body may be pivoted downwardly about its outwardly projecting tongue 62 so as to first withdraw pin 66 from aperture 68 as illustrated in FIG. 5. The downward inclination of the lower side of groove 64, together with the taper of the end of tongue 62, permits this pivotal motion to a position in which pin 66 clears the frame member 20. Then, by shifting the entire connector body inwardly to withdraw tongue 62 from groove 64, detachment of the connector body is completed. This completely frees both the connector and articulated latch from the frame and, thus, the panel 14 may be pivoted upwardly, as limited only by its hinged connection, to be detached from the frame at the hinges in a manner well known to those skilled in the art. The disconnection (and also re-connection) is most easily accomplished with one hand holding the connector body and the thumb pressing upwardly on the horizontal arm 74 of the bell crank.

It will be seen that the two engageable and disengageable connecting means formed by the pin 66 and aperture 68 and by the tongue 62 and groove 64, together with the locking bell crank 70 form a firm and secure but detachable connection that allows the parts to be readily engaged and disengaged from one another without the use of screws, loose pins or projections, brackets and the like, extending from the frame. The two projections, pin 66 and tongue 62, extend at substantially ninety degrees relative to each other, and therefore prevent all relative motion of connector body and frame except only relative pivotal motion about the tongue 62. To detach the parts one merely presses upwardly on the horizontal arm 74 of the bell crank to disengage the lock, then, with the parts still in the same one-handed grip, tilts the connector body downwardly and pulls it inwardly of the frame. To reconnect the parts the opposite motions are followed, inserting the outwardly projecting tongue 62 of the inclined connector body outwardly into the groove 64, then pivoting the entire connector body upwardly in a counterclockwise direction to seat pin 66 in the aperture 68. This counterclockwise motion causes the chamfered end of locking lip 86 to cam the locking bell crank lever in a clockwise direction against the urging of spring 78 so that the latter may cause the bell crank to snap into locking position automatically when the connector body surface 60 is seated flush against the downwardly facing surface of lower perimetrical frame member 20. Thus, both operations of connection and disconnection can readily be accomplished with one hand. No loose pins or screws need be removed and saved. No fasteners need be loosened or tightened.

The foregoing detailed description is to be clearly understood as given by way of illustration and example only, the spirit and scope of this invention being limited solely by the appended claims.

I claim:
1. A closure for a wall opening comprising
   a perimetrical frame adapted to be fixed to the perimeter of said opening, said frame having a frame recess,
   a closure panel having one side hinged to said frame, and
   a fastening device connected to said panel and detachably connected to said frame for detachably connecting the other side of said closure panel to said frame, said fastening device comprising, a latch connector body connected to said closure panel, connecting means including a projection on said connector body in releasable engagement with said frame recess, and releasable locking means pivotally mounted on said connector body and releasably engaged with a portion of said frame displaced from said recess for restraining release of said projection from said frame recess, said connecting means including means for restraining all motion of said connector body relative to said frame except a relative pivotal motion, said locking means including means for restraining said relative pivotal motion.

2. The apparatus of claim 1 wherein said locking means comprises a bell crank pivotally mounted on said connector body and spring means for urging said bell crank into engagement with said frame portion.

3. The apparatus of claim 1 wherein said frame includes an upwardly extending leg at an inner edge thereof, and wherein said locking means comprises a locking finger movably mounted to said connector body for motion between a first position in engagement with an upper end of said leg and a second position displaced therefrom.

4. The apparatus of claim 2 wherein said connecting means comprises a second recess formed in said frame and a second projection extending from said connector body into said second recess, said first mentioned projection and said second projection extending in mutually angulated directions.

5. The apparatus of claim 4 wherein said first mentioned recess opens inwardly and wherein said second recess opens downwardly, said first mentioned projection extending outwardly into said first mentioned recess, and said second projection extending upwardly into said second recess.

6. A closure for a wall opening in a vehicle roof comprising
a perimetrical frame adapted to be fixed to the perimeter of said opening, said frame having a frame recess,
a closure panel having one side hinged to said frame, and
a fastening device connected to said panel and detachably connected to said frame for detachably connecting the other side of said closure panel to said frame, said fastening device comprising,
a latch connector body connected to said closure panel,
connecting means including a projection on said connector body in releasable engagement with said frame recess, and
releasable locking means pivotally mounted on said connector body and releasably engaged with a portion of said frame displaced from said recess for restraining release of said projection from said frame recess,
said connecting means comprising a downwardly facing aperture in said frame and a projecting pin on said connector body extending upwardly from said body into said aperture,
said locking means comprising a bell crank pivoted to said connector body for motion between locking and unlocking positions, said bell crank having an upwardly extending arm in locking engagement with said frame when said bell crank is in said locking position, and means for urging said bell crank into said locking position.

7. A closure for a wall opening in a vehicle roof comprising
a perimetrical frame adapted to be fixed to the perimeter of said opening, said frame having a frame recess,
a closure panel having one side hinged to said frame, and
a fastening device connected to said panel and detachably connected to said frame for detachably connecting the other side of said closure panel to said frame, said fastening device comprising,
a latch connector body connected to said closure panel,
connecting means including a projection on said connector body in releasable engagement with said frame recess, and
releasable locking means pivotally mounted on said connector body and releasably engaged with a portion of said frame displaced from said recess for restraining release of said projection from said frame recess,
said frame having an upwardly extending leg at an inner edge thereof,
said frame recess comprising an inwardly facing groove positioned at a lower side of said frame outwardly of said leg,
said first mentioned projection comprising an outwardly projecting tongue received in said groove,
said frame having a downwardly facing aperture positioned inwardly of said groove and outwardly of said leg, an upwardly projecting pin on said connector body received in said downwardly facing aperture,
said locking means comprising a lever having an upstanding arm and a latching finger on said upstanding arm, said lever being pivoted to said body for motion of said latching finger between a locking position in which the latching finger is interengaged with said frame leg and a second position displaced from said frame leg.

8. A vehicle sunroof comprising
a perimetrical frame adapted to be secured to the edges of an opening in a vehicle roof,
said frame having a horizontally extending perimetrical downwardly facing surface member, said surface member including an upwardly projecting perimetrical leg formed at an inner edge thereof and an inwardly facing channel formed at an outer edge thereof and extending downwardly therefrom,
an aperture formed in said horizontally extending surface member,
a closure panel pivotally connected to said frame,
an articulated latch having first and second mutually pivoted links, said first link being pivoted to said closure panel, and
a latch connector comprising
a connector body pivoted at an inner end thereof to said second link,
said connector body having an upwardly facing surface extending along and engaged with a portion of the downwardly facing surface of said horizontally extending perimetrical member of said frame, an outwardly projecting tongue on said connector body extending horizontally onto said channel, an upwardly projecting pin on said connector body extending upwardly into said aperture, and releasable locking means for restraining downward motion of said connector body relative to said frame.

9. The sunroof of claim 8 wherein said locking means comprises a bell crank pivoted to an inner portion of said connector body and having a first arm exending substantially horizontally below a portion of said connector body and having a second arm projecting upwardly above said connector body, a locking finger on said second arm adapted to overlie an upper edge of said leg, and spring means for urging said locking finger into engagement with said leg.

10. The sunroof of claim 9 including mutually cooperating stop means on said connector body and bell crank for limiting motion of said bell crank relative to said connector body.

* * * * *